SELECTIVE DATA TRANSFER APPARATUS
Filed Sept. 19, 1962
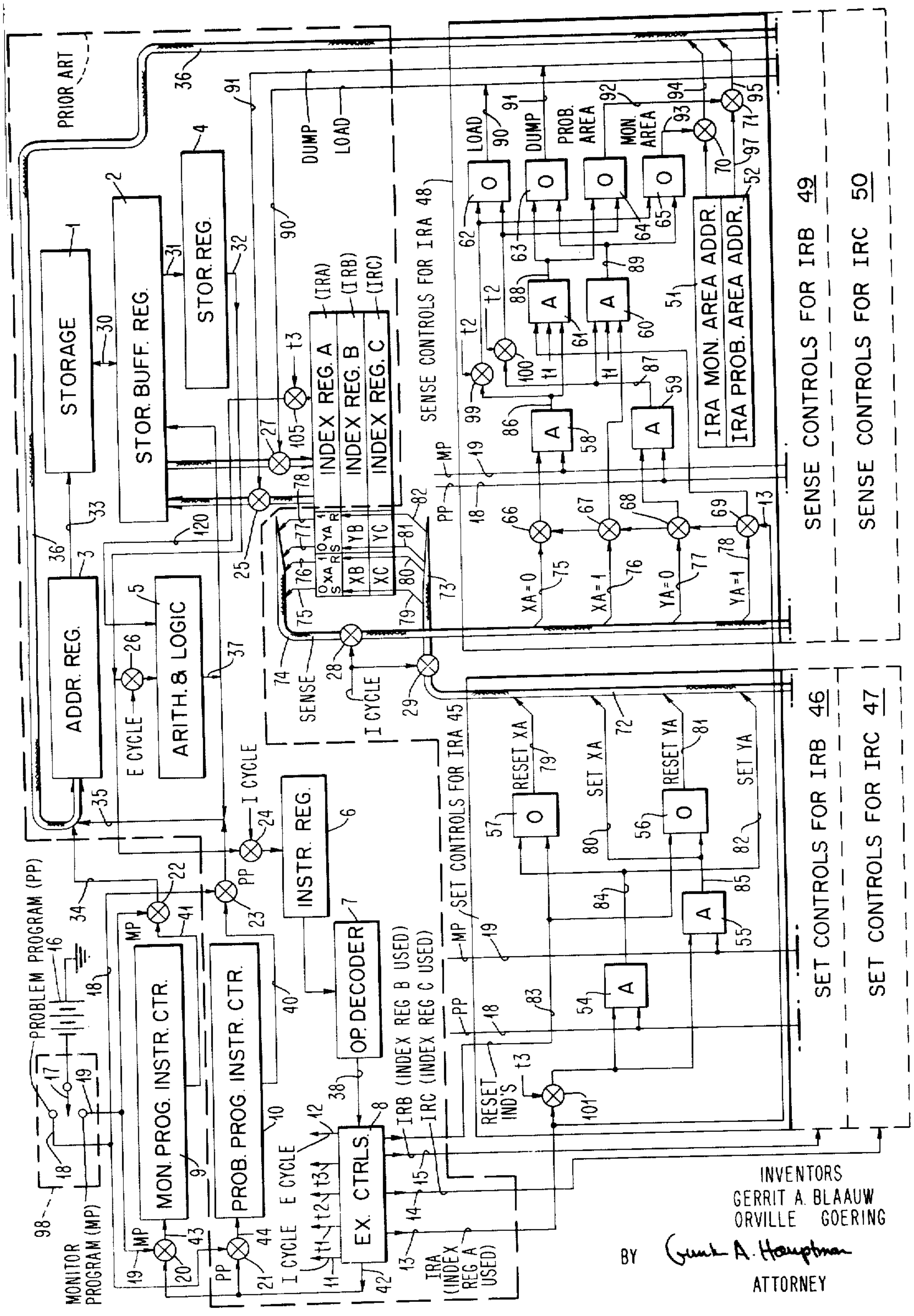
INVENTORS
GERRIT A. BLAAUW
ORVILLE GOERING
BY Frank A. Hauptman
ATTORNEY United States Patent Office 3,245,047

Patented Apr. 5, 1966

3,245,047
SELECTIVE DATA TRANSFER APPARATUS

Gerrit A. Blaauw and Orville Goering, Poughkeepsie, N.Y., assignors to International Business Machines Corporation, New York, N.Y., a corporation of New York Filed Sept. 19, 1962, Ser. No. 224,695
7 Claims. (Cl. 340—172.5)

This invention relates to electronic apparatus. More particularly, this invention relates to apparatus for efficiently sharing the use of registers, in a program controlled electronic data processing system, by a plurality of independent programs.

This invention is intended to be used in an electronic data processing system of the type disclosed in U.S. Patent 2,974,866, "Electronic Data Processing Machine," J. A. Haddad et al., issued March 14, 1961, to the International Business Machines Corporation and U.S. Patent 3,036,773, "Indirect Addressing in An Electronic Data Processing Machine," J. L. Brown, issued May 29, 1962, to the International Business Machines Corporation, and U.S. Patent 3,048,332, "Program Interrupt System," F. P. Brooks, Jr. et al., issued August 7, 1962, to the International Business Machines Corporation, which are incorporated herein by this reference. Described in these patents is a computer comprising a memory, a plurality of registers and arithmetic and logic circuitry for performing data processing operations. Each of the registers used in the computer holds a data quantity which is operated upon, or is used to control operation, during the execution of programs of instruction by the computer. Though the normal operation of the computer involves the execution of one program of instruction at a time, it is often desirable to alternate the execution of instructions from more than one program in the same computer so that (in effect) several programs are "simultaneously" executed. The "interruption" of the execution of one program for the execution of another program is described in the Brooks et al. patent above.

The execution of a program of instructions by a computer results in the manipulation and modification of data quantities stored in the memory and in the registers. Each instruction is to some extent dependent upon the results remaining from the execution of the previous instruction. Therefore, a unique relationship exists among the data quantities used during the execution of a single program of instructions; this relationship not having a meaning in any other program. This unique relationship must be preserved for each program, when the same circuitry of a single computer is to be used by more than one program of instructions. A solution is to remove ("dump") the data of the current program from the circuitry and replace ("load") with data corresponding to the next program. If the removed data is stored, in memory for example, its corresponding program can later be returned.

In the prior art a plurality of programs may be executed by a single computer by means of data transfer instructions which sequentially dump the contents of every register in the computer in turn and store the contents in memory. Additional data transfer instructions then load each register in turn with data quantities corresponding to the next program of instructions to be performed. If, for example, a computer has twelve registers used in execution of instructions, at least twenty-four dumping and loading operations are necessary. This scheme requires that the contents of every register in the computer be dumped into memory and then loaded in accordance with the next program, even though the next program will not utilize all of the registers. Since it is common for a program to use only a few of the registers available in a computer, the exchange of data during the transition between two programs is very inefficient.

It is therefore an object of this invention to permit a plurality of programs to share the registers of a computer without requiring the dumping of all registers prior to each transition between two programs.

Another object of this invention is to provide apparatus for permitting a plurality of modes of operation of a computer wherein the elements of the computer are set in accordance with a new mode only when utilized in the new mode.

Still another object of this invention is to provide selective control over the transfer of data between registers and utilization devices when there is a change in the operation of the utilization means.

A further object is to provide apparatus for permitting efficient execution of a plurality of programs in a single electronic data processing system utilizing a number of data storage means.

A still further object of this invention is to provide apparatus for automatically time-sharing utilization of storage means in an efficient manner.

These objects may be achieved in a computer by apparatus including indicating means associated with each register in the computer. When a register is used during the execution of a first program the indicating means associated with the register are set to identify the first program. When the first program is interrupted and a second program is executed, the indicator associated with each register used by the second program is examined prior to its use by the second program. If the indicator specifies that the register was last used by the first program, the contents of the register are dumped into the computer's memory and replaced by data corresponding to the second program. If the indicating means specifies that the register was used previously by the second program then the second program may immediately utilize the contents of the register since they already correspond to the second program. If the indicating means specifies that the register was not used by either the first or second program, then the second program is free to use the register immediately.

The foregoing and other objects, features and advantages of the invention will be apparent from the following more particular description of the preferred embodiment of the invention as illustrated in the accompanying drawing.

The figure is a logic diagram illustrating the attachment of one embodiment of the invention to an electronic data processing system.

*The computer*

Referring to the figure, the standard components of a computer, such as the one described in the referenced patents are shown. Briefly, a storage 1, or "memory," stores as states data "words" and instruction "words" which are accessible for transfer to a storage buffer register 2, via a line 30, in accordance with locations specified by an address register 3 on line 33. Instructions are stored in the storage 1 in sequential locations normally accessed by supplying addresses to the address register 3 from an instruction counter. Since, in this invention, more than one program of instructions is to be executed by the computer, more than one instruction counter is (as an example) provided. Other techniques (one is described in the referenced Brooks et al. patent) may be used. A "monitor" program of instructions is, for purposes of illustration, sequentially accessed by the stepping of a monitor program instruction counter 9 which supplies an address to the address register 3 on line 34 when a gate 22 is operated. A "problem" program of instructions is executed in sequence in accordance with addresses supplied to the address register 3 on line 35 from an illustrative problem program instruction counter 10 when the gate 23 is operated. One of the two programs, the monitor program or the problem program, may be selected by enabling a corresponding one of the gates 22 or 23, which may be performed symbolically, in accordance with the operation of a switch 98 (which can be operated by an instruction if desired). Gate 22 is operated by moving a contact 17 to a terminal 19 to connect a battery 16 to the gate 22. Gate 23 is operated by moving the contact 17 to a terminal 18 to connect the battery 16 to the gate 23. When the monitor program instruction counter 9 is connected to the address register 3 via the gate 22, as just described, it may be incremented to address the next sequential instruction in the monitor program by means of a signal on a line 43 from a gate 20 which gate is operated at the same time that the gate 22 is operated. Similarly, the problem program instruction counter 10 is incremented by signals on the line 44 from gate 21 which gate is operated at the same time that gate 23 is operated When an instruction in one of the programs is addressed by the address register 3, the entire instruction is brought into the storage buffer register 2.

A typical instruction is divided into a number of fields, most important of which are an address field and an operation code field. (A tag field may also be provided to specify an index register as explained below.) The address field usually specifies a location in the storage 1 wherein may be found a data word, and the operation code field specifies the operation to be performed upon the specified data word. An instruction at a storage 1 location specified in the address register 3, is transferred via line 31 to a storage register 4 from where the address field is placed into an arithmetic and logic circuit 5 via line 32. The operation code is placed into an instruction register 6 via a gate 24 operated by a signal on an I cycle line 11 from execution controls 8. The contents of the instruction register 6 are interpreted by an operation decoder 7 which applies signals via line 38 to the execution controls 8.

The execution controls 8 provide signals to operate gates in the computer on a plurality of lines of which only the ones pertinent to this invention are shown. Initially the execution controls provide a signal on the I cycle line 11 indicating that an instruction is to be interpreted. Subsequent to the interpretation of an instruction a signal may be applied on the line 42 to step one of the instruction counter 9 and 10 to a new instruction and an execution cycle may be initiated by placing a signal on the E cycle line 12. If an indexing operation (wherein a modifying number is added to the address specified by the address field) is called for by an instruction, one of three index registers IRA, IRB or IRC is identified by a signal on a corresponding one of the lines 13, 14 and 15. Also available from the execution controls 8 are signals on lines t1, t2 and t3, which signals occur at successive intervals, and a signal on a reset indicators line 83 to be explained below.

The occurrence of an E cycle disables gate 24 and causes operation of gate 26 to pass the address field of the current instruction from the storage register 4 to the arithmetic and logic circuit 5 from where it emerges on line 37 and is transferred, in the normal (unindexed) case, to the address register 3 to select a data word. In this case, the data word at the address specified by the address register 3 contents will be brought into the storage buffer register 2 and transfered to the arithmetic and logic circuit 5, via the storage register 4, for operation in accordance with signals from the execution controls 8. If, however, the current instruction specifies an indexing operation, there is placed on the line 120 (via gate 105 as explained below) an address modifier which is added by the arithmetic and logic circuits 5 to the instruction address entered via the gate 26. The sum of these addresses, called the "effective" address, emerges from the arithmetic and logic circuit 5 on line 37 and is placed into the address register 3 to specify a data word location. The source of address modifier added to the address field of the current instruction is one of three index registers IRA, IRB and IRC specified by the tag field of the instruction. Each index register comprises a number of storage positions for holding a binary quantity to be added to address fields of instructions. Each index register may be loaded from the storage 1 by means of a cable connected to the storage buffer register 2, by operation of a gate 27 (as will be explained below). The contents of each index register may be stored in storage by operation (as will be explained below) of a gate 25 connecting the index registers IRA, IRB and IRC and the storage buffer register 2, the contents being transferred between the storage buffer register 2 and the one index register currently specified by an instruction. The place in storage 1 to, or from, which the transfer will be made is specified by the address register 3 in accordance with an address supplied on cable 36 as will be described below.

*Indicator circuits*

Associated with each index register IRA, IRB and IRC are two bistable storage devices XA and YA, XB and YB and XC and YC, respectively. Both of the storage devices associated with an index register may be simultaneously set or sensed, the particular pair being determined by which index register is currently specified by an instruction. Each storage device is a flip-flop circuit, of any one of the many available designs, which may be "set" to store a 1-bit by means of a signal on a set line or "reset" to store a 0-bit by a signal on a reset line. In the apparatus shown, only the set and reset lines in cable 73 for flip-flops XA and YA are drawn. Flip-flops XA and YA are set by a signal on a corresponding one of the lines 79 and 81 and reset to store a 0-bit by means of a signal on a corresponding one of the lines 80 and 82. If one of the flip-flops XA or YA is set to the one state, this condition may be detected by sensing the corresponding one of the lines 76 and 78. If one of the flip-flops XA or YA is set to the zero state, this condition may be detected by sensing a corresponding one of the lines 75 and 77. Additional sense lines, in the cable 74 for flip-flops XB, YB, XC and YC are provided but not shown.

Sense controls 48, 49 and 50 are provided for corresponding ones of the index registers IRA, IRB and IRC. It is the function of the sense controls to recognize the settings of the indicators associated with the corresponding index register. Set controls 45, 46 and 47 are associated with corresponding ones of the index registers IRA, IRB and IRC. The set controls 45, 46 and 47 cause the indicators associated with the corresponding index register to assume states indicative of the last program to have used the index register. The sense controls 48, 49 and 50 and the set controls 45, 46 and 47, in conjunction with the indicators of index registers IRA, IRB and IRC, control the dumping and loading of index registers during program execution. Table I illustrates the meanings given to the indicators X and Y.

TABLE I

*Indicators*

| X | Y | Meaning |
|---|---|---|
| 0 | 0 | IR not yet used. |
| 0 | 1 | IR last used by PP. |
| 1 | 0 | IR last used by MP. |
| 1 | 1 | (No meaning). |

PP: Problem Program. MP: Monitor Program.

Thus, the indicators X and Y associated with the index registers IRA, IRB and IRC show, by their contents, whether the associated index register (IR) was used previously, and if so, by which program (problem program PP, or monitor program MP). It is obvious that similar indicators may be provided for every register, counter, etc. in the computer. Further, additional indicators may be provided to increase (using one method) the number of programs which may use each register. Another method for increasing the number of programs without additional indicators will be described below.

The sense controls 48 for one of the index registers IRA are shown in detail, the circuitry 49 and 50 being similar for the other index registers IRB and IRC. The function of the sense controls 48 is to recognize the states to which the indicators XA and YA are set and to generate signals controlling data transfers between index register IRA and storage buffer register 2. The types of control exercised in response to different indicator states are shown in Table II.

TABLE II

*Sense controls*

| Case | X | Y | Program | IR Contents |
|---|---|---|---|---|
| 1 | 0 | 0 | MP | Transfer to Arith. and Logic 5. |
| 2 | 0 | 1 | MP | (a) Dump in PA, (b) Load from MA, (c) Transfer to Arith. and Logic 5. |
| 3 | 1 | 0 | MP | Transfer to Arith. and Logic 5. |
| 4 | 0 | 0 | PP | Transfer to Arith. and Logic 5. |
| 5 | 0 | 1 | PP | Transfer to Arith. and Logic 5. |
| 6 | 1 | 0 | PP | (a) Dump in MA, (b) Load from PA, (c) Transfer to Arith. and Logic 5. |

MP: Monitor Program. PA: Problem Area. PP: Problem Program. MA: Monitor Area.

From this table it can be seen that the sense controls 48 permit the contents of index register IRA to be transferred to the arithmetic and logic circuit 5 whenever the contents of the register IRA correspond to the current program executed (as indicated in Table I). The contents of index register IRA correspond to the currently executed program when the last utilization of the index register IRA was by the current program (cases 3 and 5) or when the index register IRA was not previously used by any program (cases 1 and 4). If, on the other hand, the index register IRA was utilized by another program (cases 2 and 6), the current program cannot transfer the index register IRA contents to the arithmetic and logic circuit 5 until after the current index register IRA contents are loaded into storage 1 and replaced with data corresponding to the current program. In cases 2 and 6 the contents of the index register IRA are dumped into a monitor area (case 6) or a problem area (case 2) provided in the storage 1 by operation of gate 25 and a quantity corresponding to the current program is then loaded from the monitor area (case 2) or the problem area (case 6) into the index register IRA by operation of the gate 27. It is obvious that, in cases 2 and 6, loading step (b) may be omitted for instructions which place information into the index register IRA since they do not operate upon previous information.

The settings of indicators XA and YA are transferred on cable 74 via gate 28, during I cycles, to gates 66, 67, 68 and 69. The gates 66 and 69 are enabled when the execution controls 8 indicate by a signal on line 13 that the index register IRA is to be used during the current instruction. If the current instruction is part of a problem program PP, a signal will appear on line 18, from the switch 98, which is applied to one input of the AND circuit 59. If the current instruction is part of a monitor program MP, a signal will appear on line 19 from the switch 98, to be applied to one input of AND circuit 58. The output 87 of AND circuit 59 is applied directly to one input of AND circuit 60 and through a gate 100 to one input of each one of OR circuits 62 and 65. The output 86 of AND circuit 58 is applied directly to one input of AND circuit 61 and through a gate 99 to the inputs of OR circuits 62 and 65. Timing signals are applied by the execution controls 8 to AND circuits 60 and 61 (at time *t1*) and to gates 99 and 100 (at time *t2*) in an order which assures that there will be outputs (if any) from OR circuits 62 through 65. This performs, as will be explained, dumping (at time *t1*) before loading (at time *t2*). For example, if there are signals on $XA=0$ line 75, $YA=1$ line 78 and MP line 19 (Table II, case 2), there will be an output on line 86 from AND circuit 58. When a signal appears on line *t1* to AND circuit 61, a signal will appear at its output 88 which is applied to OR circuits 63 and 64, placing signals on dump line 91 and problem area line 92. Subsequently, at time *t2*, gate 99 is operated allowing signals to appear on load line 90 and monitor area line 93. As a result of the signal *t1* gate 25 and gate 71 are simultaneously operated to dump the contents of index register IRA into storage 1 at a location supplied to the address register 3 by a problem area address register 52. Subsequently at time *t2* gates 27 and 70 are simultaneously operated to load the index register IRA from a storage 1 location supplied to the address register 3 by a monitor area address register 51. Thus, in the case when the indicators XA and YA specify that index register IRA was previously used during a problem program, the current instruction using index register IRA (which is in a monitor program) will first cause the index register IRA contents to be dumped in a problem area address in storage 1 and then cause it to be loaded from a monitor area address in storage 1. Similarly, the contents of index register IRA are first dumped into a monitor area address of storage 1 and then loaded from a problem area address of storage 1 if the indicators XA and YA identify the previous utilization of index register IRA as being by a monitor program, whereas the current instruction utilizing index register IRA belongs to a problem program (Table II, case 6). This occurs when there are signals on $XA=1$ line 76, $YA=0$ line 77 and PP line 18. Outputs occur from AND circuits 59 and 60 in an order which initially enables gates 25 and 70 and subsequently enables gates 27 and 71.

Once an index register IRA, IRB or IRC is filled with the proper data corresponding to the current program, it is utilized to modify the address of the instruction referring to it by a signal from the execution controls 8 at time *t3* which operates gate 105. At this time also the set controls 45, 46 and 47 corresponding to this index register reset the associated indicators, in accordance with the rules of Table I above, to reflect the fact that an instruction in the current program has used the index register. For example, the set controls 45 for index register IRA are operated when gate 101 is enabled at time *t3*. If the current instruction, referring to index register IRA, is part of a problem program PP, a signal will appear on line 18, from the switch 98, to place signals at time *t3* on reset XA line 79 and set YA line 82. If, on the other hand, the current instruction is part of a monitor program MP, a signal will appear on line 19 to place signals at time *t3* on lines set XA line 80 and reset YA line 81. Both indicators may be reset by signals on reset XA line 79 and reset YA line 81 as a result of an instruction (usually in a monitor program) which causes the execution controls to place a signal on the reset indicators line 83. This condition is used to reset the indicators XA and YA at the start of operation and also to permit more than two programs to be executed without additional indicators.

Additional programs may be executed without adding more indicators to the registers by providing instructions in one of the programs (for example the monitor program MP) which will cause a third program to completely replace the other (problem program PP). As in the prior art, all registers must be dumped and then loaded in anticipation of the third program. An instruction at the end of this "replacement" routine signal the reset indicators line 83 to reset all indicators prior to execution of the third program. The third program then shares the computer with the first (monitor program MP, in this example) in place of the second (problem) program. In this manner, any program of a plurality of programs may be executed by substituting it for one, or the other, of the two programs sharing the computer. Further, since (by adding indicators) more than two programs can share a computer, many additional combinations of "sharing" and "replacement" are possible.

*Operation*

The operation of the apparatus shown in the drawing will now be described with reference to Tables III and IV.

TABLE III

*Code and meaning*

ADD Y, IXR—The contents of a storage 1 location determined by adding number in the address field Y to the contents of the index register specified by the tag field IXR are algebraically added to the number stored in the arithmetic and logic unit 5.

CLA Y, IXR—The contents of a storage 1 location determined by adding number in the address field Y to the contents of the index register specified by the tag field IXR field are placed into the arithmetic and logic unit 5.

HLT—Operation of the computer is halted.

LXA Y, IXR—The contents of a storage 1 location specified by the address field Y replace the contents of the index register specified by the tag field IXR.

PAX 0, IXR—A number stored in the arithmetic and logic unit 5 replaces the contents of the index register specified by the tag field IXR.

PXA 0, IXR—The contents of the index register specified by the tag field IXR are placed into the arithmetic and logic unit *t*.

STO Y, IXR—A number stored in the arithmetic and logic unit 5 is placed into a storage 1 location determined by adding the number in the address field Y to the contents of the index register specified by the tag field IXR.

STZ Y, IXR—The contents of the storage 1 location determined by adding the number in the address field Y to the contents of the index register specified by the tag field IXR are set to all zeros.

SUB Y, IXR—The contents of a storage 1 location determined by adding the number in the address field Y to the contents of an index register specified by the tag field IXR field are algebraically subtracted from a number stored in the arithmetic and logic unit 5.

TRA Y, IXR—The computer takes its next instruction from a storage 1 location determined by adding the number in the address field Y to the contents of the index register specified by the tag field IXR.

Table III gives the meaning of certain instructions which may be executed by the computer described in the referenced patents, which instructions are useful here to illustrate operation of the apparatus embodying the invention.

Table IV illustrates the order in which eleven instructions from two programs are executed as the program switch 98 is changed from the problem program position PP to the monitor program MP position and back again. Table IV also shows the contents of two of the index registers IRA and IRB during these operations.

Initially the program switch 98 is set to specify the execution of a problem program PP starting with an instruction (STZ 145, 0) stored in location 314 of the storage 1. The index registers IRA and IRB are initially set to zero, and the associated indicators XA, XB, YA and YB are set to zero.

During step 1 the contents (314) of the problem program instruction counter 10 are transferred via the gate 23 to the address register 3 causing an instruction (STZ 145, 0) to be placed into the storage buffer register 2. The execution controls 8 initially emit a signal on I cycle line 11. The current instruction (STZ 145, 0) enters the storage register 4 and the operation portion (STZ) and index register tag field (0) enter the instruction register 6 via gate 24. The operation decoder recognizes the instruction in the instruction register 6 as being one which will store zeros in a specified storage location (145) and which does not utilize any index registers. The execution controls 8 terminate the signal on I cycle line 11 and emit one on E cycle line 12, and the address field (145) is transferred via the arithmetic logic circuit 5, output 37 to the address register 3, input 35. Data at storage 1 location 145 is, as a result, transferred through the storage buffer register 2 and the storage register 4 to the arithmetic and logic unit 5. The execution of this instruction is completed by the storage of zeros at location 145 in the storage 1. Since this instruction did not refer to any of the index registers, the indicators XA, XB, YA and YB associated with index registers IRA and IRB remain unchanged. A signal appears on line 42 from the execution controls 8 to step the problem program instruction counter 10 to indicate the location (315) of the next instruction (LXA 50, IRA); the signal on E cycle line 12 being terminated and a signal being placed on I cycle line 11.

During step 2, the next instruction (LXA 50, IRA) is brought out of the storage 1 and interpreted in the same manner previously described for the instruction STZ 145 0. This instruction, however, utilizes index register IRA for specifying an index register (IRA) which is to be loaded from a memory location (50). The execution controls 8 place a signal on IRA line 13 to IRA sense controls 48, operating gates 66–69. Since the specified index register IRA was not previously utilized by any program, the sense controls 48 receive signals on $XA=0$ line 75 and $YA=0$ line 77, which pass through gates 66 and 68 but have no other effect. The address field (50) of the current instruction (LXA 50, IRA) is placed into the address register 3 to transfer from storage 1 location 50 to storage buffer register 2 a number (5) which will be entered into index register IRA via a cable (not shown) from the storage buffer register 2. When a *t*3 signal is

TABLE IV

| Step | Program Switch 98 | PPIC 10 | Problem Program Instructions Exec. | MPIC 9 | Monitor Program Instructions Exec. | IRA | | | IRB | | |
|---|---|---|---|---|---|---|---|---|---|---|---|
| | | | | | | XA | YA | Contents | XB | YB | Contents |
| 1 | PP | 314 | STZ 145, 0 | 430 | | 0 | 0 | 0000 | 0 | 0 | 0000 |
| 2 | PP | 315 | LXA 50, IRA | 430 | | 0 | 1 | 0101 | 0 | 0 | 0000 |
| 3 | PP | 316 | CLA 6, IRA | 430 | | 0 | 1 | 0101 | 0 | 0 | 0000 |
| 4 | MP | 317 | | 430 | PXA 0, IRA | 1 | 0 | 1111 | 0 | 0 | 0000 |
| 5 | MP | 317 | | 431 | SUB 70, IRA | 1 | 0 | 1111 | 0 | 0 | 0000 |
| 6 | MP | 317 | | 432 | PAX 0, IRA | 1 | 0 | 0011 | 0 | 0 | 0000 |
| 7 | MP | 317 | | 433 | CLA 68, IRA | 1 | 0 | 0011 | 0 | 0 | 0000 |
| 8 | MP | 317 | | 434 | TRA PP, 0 | 1 | 0 | 0011 | 0 | 0 | 0000 |
| 9 | PP | 317 | ADD 7, IRB | 435 | | 1 | 0 | 0011 | 0 | 1 | 0000 |
| 10 | PP | 318 | STO 145, IRA | 435 | | 0 | 1 | 0101 | 0 | 1 | 0000 |
| 11 | PP | 319 | HLT | 435 | | 0 | 1 | 0101 | 0 | 1 | 0000 |

generated by the execution controls 8, the signal on IRA line 13 is applied to the set controls 45 via gate 103. Since a problem program is in progress there is also a signal on PP line 18. As a result, there will be an output on line 84 from AND circuit 54 causing signals to appear on reset XA line 79 and set YA line 82. Indicator XA therefore stores a 0-bit and indicator YA stores a 1-bit. A signal appears on output line 42 from the execution controls 8 to step the problem program instruction counter 10 to the next instruction location (316).

During step 3, the next instruction (CLA 6, IRA) is removed from storage 1 location 316 in a manner previously described. This instruction (part of a problem program) utilizes index register IRA (previously filled by an instruction in the same program) for modifying its address field (6). The execution controls 8 place a signal on IRA line 13 which is applied to gates 66 through 69 of the sense controls 48. The setting of indicators XA (=0) and YA (=1) cause outputs from gates 66 and 69 to be applied to AND circuits 58 and 61. Since a problem program is in progress, the signal on the PP line 18 does not enable either of these AND circuits. Therefore, there will be no outputs from the IRA sense controls 48 and the index register IRA contents will be utilized. When execution controls 8 omit a signal *t3*, gate 105 is enabled and the contents (0101) of index register IRA are transferred to the arithmetic and logic circuit 5 for addition to the address (6) of the current instruction (CLA 6, IRA). The output (the decimal value 11) on line 37 is sent to the address register 3 to obtain a data word from storage 1 which is placed into the arithmetic and logic unit 5. A signal appears on line 42 from the execution controls to step the problem program instruction counter 10 to the location (317) of the next problem program instruction (ADD 7, IRB). This instruction, which will add a number to the number just placed into the arithmetic and logic unit 5 will not, however, be immediately executed because the program switch 98 is changed to request a monitor program execution.

During step 4 an instruction (PXA 0, IRA) at a location (430) specified by the monitor program instruction counter 9 is removed from storage 1 and interpreted in the same manner as the problem program instructions previously described. This instruction (PXA 0, IRA) specifies that the contents of index register IRA are to be placed into the arithmetic and logic unit 5. However, the present contents (0101) of index register IRA are not the contents that the instruction (PXA 0, IRA) is intended to refer to since the present contents were placed thereby another (problem) program. The current contents of index register IRA must therefore be dumped into storage 1 and a quantity corresponding to the monitor program must be obtained. The execution controls 8 place a signal on line 13 activating gates 66 through 69 causing outputs from gates 66 (which has an input $XA=0$) and 69 (which has an input $YA=1$). A signal on MP line 19 results in an output from AND circuit 58 and input to AND circuit 61. When a *t1* signal from execution controls 8 is applied to AND circuit 61, an output ocurs on line 88 and is applied to OR circuit 63 and 64 to cause operation of gates 25 and 71. Thus, the present contents (0101) of index register IRA are dumped into a storage 1 location specified by the problem area address register 52, the contents (0101) of which are transferred via gate 71 and cable 36 to the address register 3. Subsequently, upon the occurrence of a *t2* signal from execution controls 8, outputs occur from OR circuit 62 and 65 to operate gates 27 and 70. This causes the index register IRA to be loaded from a storage 1 location specified by the monitor area address register 52, the contents (1111) of which are transferred via gate 70 and cable 36 to the address register 3. The contents (1111) of this address are brought into the storage buffer register 2 and then transferred by operation of gate 27 to the index register IRA. When this operation is completed, a signal *t3* appears from the execution controls 8 to operate the gate 105, transferring the contents (1111) of index register IRA to the arithmetic and logic circuit 5 in accordance with the current instruction (PXA 0, IRA). It will be remembered that during step 3, the problem program instruction (CLA 6, IRA) placed a number into the arithmetic and logic unit 5. It is not thought necessary to explain here how this number is dumped into storage 1 prior to the loading of the index register IRA contents into the units in accordance with the current instructions since all registers in the computer may be adapted to operate in accordance with this invention as explained in detail with reference to index register IRA. At time *t3* also, a signal on line 13 is passed by gate 101 in the set controls 45. Since there is a signal on MP line 19 there will be an output on line 85 of AND circuit 55 causing signals on set XA line 80 and reset YA line 81. A 1-bit is therefore stored in indictor XA and a 0-bit is stored in indicator YA. The monitor program instruction counter 9 incremented to indicate the location (431) of the next instruction (SUB 70, IRA).

During steps 5 through 8 four instructions of the monitor program are executed performing operations explained in Table III, each one of these instructions utilize the contents of index register IRA. One of the instructions (PAX 0, IRA) modifies the contents of index register IRA, while another instruction (TRA PP, 0) causes a transfer back to the problem program. The means by which this is accomplished are not shown in the drawing but are obvious (for example the switch 98 may be directly operated by the instruction, or the instruction may light an indicator which signals an operator to change the position of switch 98).

During step 9 the problem program is resumed with the execution of the instruction ADD 7, IRB which refers to, previously unused, index register IRB. During the execution of this instruction the contents (0000) of the index register IRB are utilized and subsequently the set controls 45 cause signals to appear on reset XA line 79 and set YA line 82 in response to inputs on line 15 and PP line 18. As previously mentioned, the arithmetic and logic units contents will have to be exchanged to conform to the current program in the same manner as the index registers. The problem program instruction counter 10 is incremented by a signal on line 42.

During step 10 the next problem program instruction (STO 145, IRA) is executed. This instruction refers to index register IRA for the purpose of modifying its own address field (145). The modifying quantity referred to is not, however, the one presently found in the index register IRA, since the current contents (0011) are the result of operations during the monitor program. A signal on line 13 enables gates 66 and 68 which receive inputs on lines $XA=1$ and $YA=0$. As a result of these signals and a signal on PP line 18 there will be an output from AND circuits 59 and an input to AND circuit 60. At times *t1* a pair of signals will appear on dump line 91 and monitor area line 93 followed at time *t2* by a pair of signals on load line 90 and problem area line 92. These signals cause the current contents (0011) of the index register IRA to be dumped into a location specified by the monitor area address register 51, and the contents (0101) of the address specified by the problem area address register 52 to be loaded into the index register IRA. The contents (0101) of the index registers IRA are then, at time *t3*, passed by gate 105 for modifying, in the arithmetic and logic circuit 5, the address (145) of the current problem program instruction. During this step also indicators XA and YA of index register A are adjusted by signals on lines reset XA line 79 and set YA line 82, as previously described, to reflect usage of the index register IRA by the problem program. The problem program instruction counter is then stepped to access the next instruction (HLT), which instruction step 11 terminates operation of the computer.

There has been described apparatus for permitting a plurality of programs to share the use of a single computer. Each register in the computer may be provided with indicators which store signals for indicating to which program the contents of the register belong. If an instruction referring to a particular register belongs to a program other than the one to which the contents of the register belong, the contents of the register are automatically dumped and then loaded with information corresponding to the current program. Thus the contents of registers are associated with different programs only as they are referred to by the programs without necessity of dumping and reloading every register regardless of use, prior to the execution of every program.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for permitting execution of a plurality of programs in a single electronic data processing system utilizing a number of data storage means, including:

first indicating means for identifying currently executed programs;

a number of second indicating means, one associated with each of said storage means, each settable to indicate the last one of said plurality of programs to have utilized the associated storage means;

setting means, connected to said first and second indicating means, operable to set said second indicating means in accordance with programs identified by said first indicating means;

and sensing means, connected to said second indicating means, and operable in accordance with the settings of said second indicating means to control storage of data in storage means utilized by said programs to insure a relationship between data in said storage means and the currently executed program.

2. The apparatus of claim 1, further including:

reservoir means;

and transfer means, connected to said reservoir means, said storage means and said sensing means, operable under control of said sensing means to transfer data between said reservoir means and said storage means utilized by said programs.

3. In combination:

a plurality of registers;

a plurality of state indicating means, one corresponding to each register;

utilization means, connected to said registers, operable to utilize selected ones of said registers in specified ones of a number of modes of operation;

and control means, connected to said registers, said indicating means and to said utilization means, operable in accordance with states indicated by said indicating means to control utilization of corresponding registers by said utilization means.

4. The combination of claim 3, further including:

second control means, connected to said indicating means and to said utilization means, operable in accordance with said utilization means to cause said indicating means associated with selected registers to assume states indicative of the specified modes of operation.

5. In an electronic data processing system operable in accordance with a number of individually executed programs of instructions, comprising:

a plurality of registers, each operable to contain a quantity and usable by a program;

a plurality of indicators, one indicator being connected to each of said registers, operable to indicate the last program to have utilized the register;

memory means, connected to said registers, operable to store for each register a quantity corresponding to each of said programs;

sensing means, connected to said indicators, operable to generate a signal when the last program to have utilized a register utilized by a current program differs from the current program;

and control means, connected to said sensing means, said registers and said memory, operable in accordance with said signal to place the contents of the utilized register in memory and to place in said register a quantity from memory corresponding to the current program.

6. Apparatus for utilizing a plurality of data registers during the execution of instruction, each instruction being assigned to one of a plurality of programs, including:

indicating means, associated with each of said registers, operable to assume states indicative of the program to which was assigned a last one of said instructions to have utilized the associated register;

control means, associated with each of said registers and said indicating means, each operable when the associated register is utilized by an instruction to generate control signals in accordance with said indicating means states;

memory means, having a number of data locations corresponding to each of said registers;

and data transfer means, interconnecting said memory means and said registers, operable in accordance with said control signals to exchange data between a register and corresponding memory locations when said register is utilized by an instruction assigned to a program other than the program to which the last instruction to have utilized said register was assigned.

7. The apparatus of claim 6 wherein said data transfer means include:

dumping means, operable in accordance with said control signals to transfer data from a register to a corresponding memory location;

and loading means, operable in accordance with said control signals after the transfer of data from said register, to transfer data to said register from another memory location.

References Cited by the Examiner

UNITED STATES PATENTS

| | | | |
|---|---|---|---|
| 3,029,414 | 4/1962 | Schrimpf ________ | 340—172.5 |
| 3,079,082 | 2/1963 | Scholten et al. ____ | 340—172.5 |
| 3,142,043 | 7/1964 | Schrimpf ________ | 340—172.5 |

ROBERT C. BAILEY, *Primary Examiner.*